June 26, 1962 — B. P. BROWN ETAL — 3,041,558
WAVEGUIDE SYSTEM
Filed March 24, 1955 — 5 Sheets-Sheet 1

Inventors:
Earl R. Robbins,
Burton P. Brown,
by Michael Masnik
Their Agent.

June 26, 1962 B. P. BROWN ETAL 3,041,558
WAVEGUIDE SYSTEM
Filed March 24, 1955 5 Sheets-Sheet 2

Inventors:
Earl R. Robbins,
Burton P. Brown,
by Michael Masnik
Their Agent.

June 26, 1962  B. P. BROWN ETAL  3,041,558
WAVEGUIDE SYSTEM
Filed March 24, 1955  5 Sheets-Sheet 3

Inventors:
Earl R. Robbins,
Burton P. Brown,
by Michael Masnik
Their Agent.

June 26, 1962   B. P. BROWN ETAL   3,041,558
WAVEGUIDE SYSTEM
Filed March 24, 1955   5 Sheets-Sheet 4
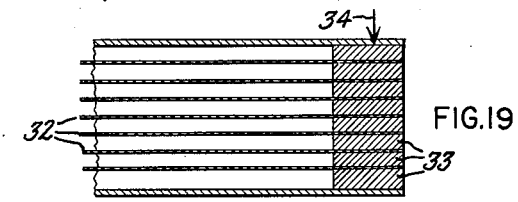
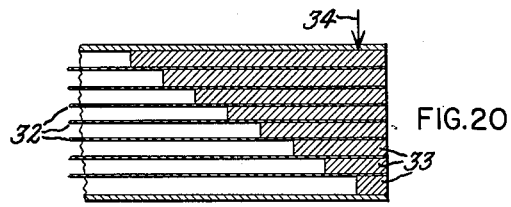
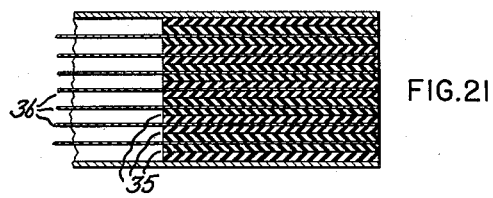
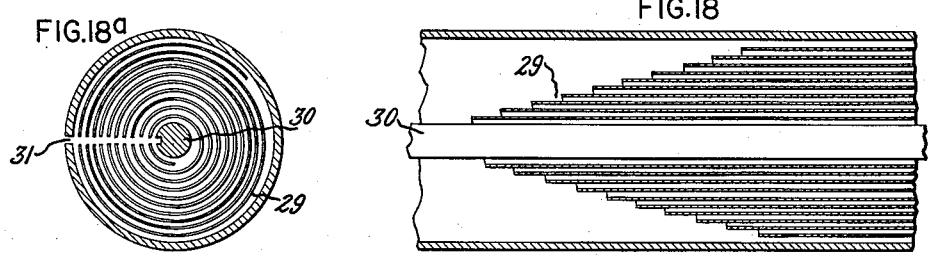
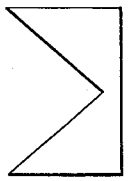  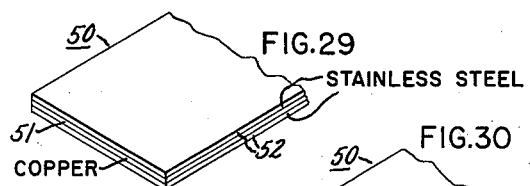
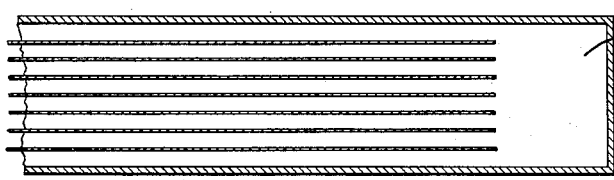 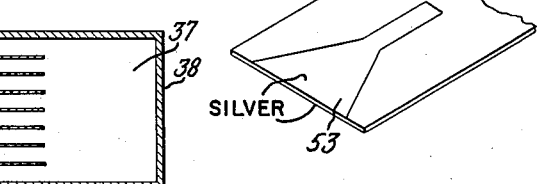
Inventors:
Earl R. Robbins,
Burton P. Brown,
by *Michael Masnik*
Their Agent.

June 26, 1962 B. P. BROWN ETAL 3,041,558
WAVEGUIDE SYSTEM
Filed March 24, 1955

Inventors:
Earl R. Robbins,
Burton P. Brown,
by Michael Masnik
Their Agent.

United States Patent Office 3,041,558
Patented June 26, 1962

3,041,558
WAVEGUIDE SYSTEM
Burton P. Brown and Earl R. Robbins, Baldwinsville, N.Y., assignors to General Electric Company, a corporation of New York
Filed Mar. 24, 1955, Ser. No. 496,381
5 Claims. (Cl. 333—81)

This invention relates primarily to wave transmission methods and means, and particularly to methods and means for controlling electromagnetic waves.

In the electrical and electronics industry there exists the need for high-powered coaxial transmission lines and waveguide components which are suitable for application as low reflection terminations or loads, attenuators, matching sections, and radiators, etc. Prior method and means for satisfying these needs have been found to be limited to relatively low power handling capacity for their size, low temperature operation, instability and undesirable dependence upon environmental conditions. An arrangement or scheme which would satisfy these needs as well as provide a more rugged arrangement adaptable to automatic assembly is highly desirable.

It is therefore, an object of our invention to provide a desired wave propagating system and method.

Another object of our invention is an improved electromagnetic wave attenuating method and means.

Another object of our invention is to provide an improved load circuit for use with wave propagating media.

Another object of our invention is to provide an improved method and means for the attenuation of electromagnetic waves.

Another object of our invention is to provide improved matching and terminating wave propagating assemblies.

A further object of our invention is to provide an improved method of and means for the construction of wave propagating components.

Another object of our invention is to provide method and means controlling electromagnetic waves.

A further object of our invention is to provide improved method and means for coupling electromagnetic waves, between circuits.

In accordance with one embodiment of applicants' invention, a novel improved method and means are described for the desired propagation of electromagnetic waves. The method and means employs a series of metallic or conductor plates placed in a wave transmission line or waveguide in such a manner that the plates remain perpendicular to the dominant or fundamental electric field lines. Various configurations of plates and waveguide assemblies are described which are applicable as low reflection terminations, attenuators and matching sections.

The novel features which we believe to be characteristic of our invention are set forth with particularity in the appended claims. Our invention itself, however, both as to its organization and method of operation together with further objects and advantages thereof may best be understood by reference to the following description taken in connection with the accompanying drawings in which:

FIGS. 18 and 18a illustrate in cross-sectional form a spiral wound, step plate construction applicable to coaxial transmission lines;

Figure 25:
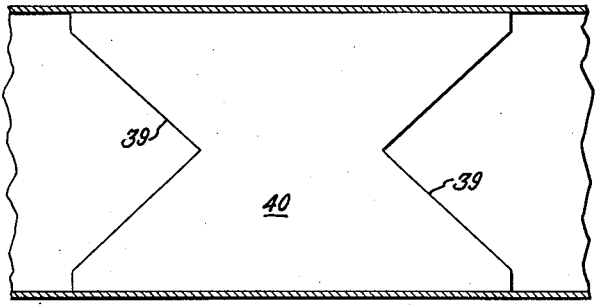
Figure 26A:
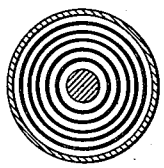
Figure 26:
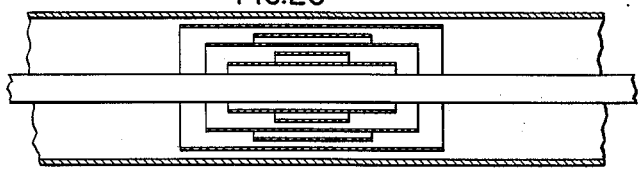
Figure 27:
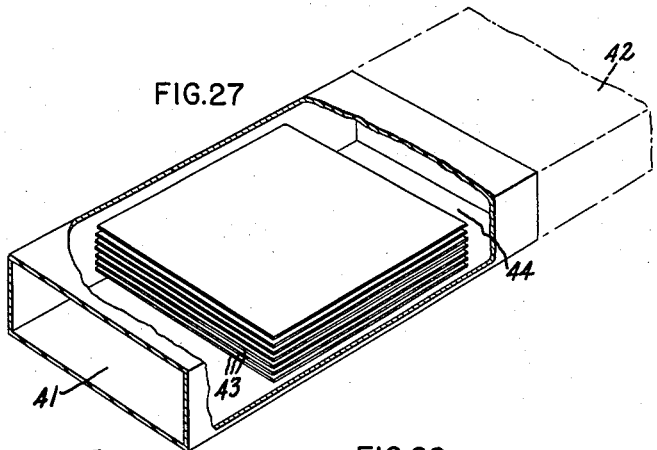
Figure 28:
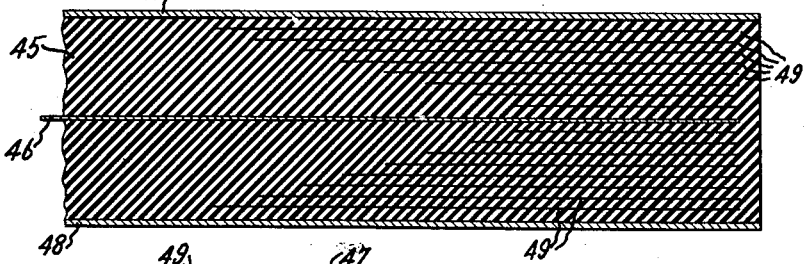
Figure 28A:
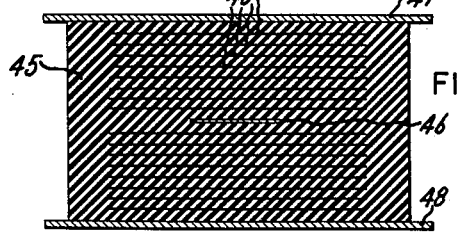

FIGS. 19, 20, and 21 illustrate method and means for terminating waveguide loads;

FIGS. 22 and 23 illustrate in plan view configurations of shorting plates which may be used in the construction of the waveguide arrangement of FIGS. 19 through 21;

FIG. 24 illustrates a form of open circuit termination applicable to waveguide construction employing either thick or thin metallic plates;

FIG. 25 illustrates an attenuation pad construction applicable to waveguide transmission lines;

FIGS. 26 and 26a illustrate in cross-sectional form an attenuation pad applicable to coaxial line type transmission systems;

FIG. 27 illustrates in cut-away cross section form a matching pad construction applicable to waveguide systems;

FIGS. 28 and 28a illustrate an application of the invention to sandwich type waveguide construction; and FIGS. 29 and 30 illustrate other embodiments of the waveguide attenuating member.

In the following description of waveguide and wave transmission arrangements embodying the invention, certain spacings and orientation of metallic plates are assigned in order to facilitate an understanding of the invention. It is to be understood, however, that such assignments are purely by way of example and are not to be construed in any way as limiting the scope of the invention.

Figure 1A:
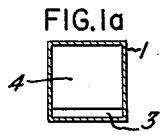
FIGS. 1 and 1a are diagrams in cross sectional form of a prior art arrangement for attenuating electromagnetic waves propagated along a section of waveguide.
Figure 1:
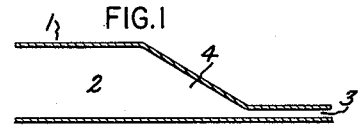
Figure 2B:
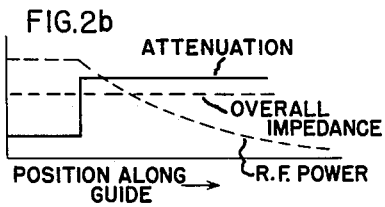
FIGS. 2 and 2a are diagrams in cross-sectional form of an improved waveguide attenuator construction in accordance with the present invention. The associated graph of FIG. 2b shows radio frequency power, attenuation and overall impedance plotted as a function of position along the waveguide.
Figure 2:
Figure 2A:
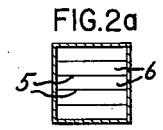

Referring to FIG. 1 there is shown in cross-sectional form a square waveguide 1. Normally the dimensions of the guide are optimized to permit the efficient transmission of power at a given frequency. It is well known that the variation in wave attenuation of a waveguide varies in exponential manner with respect to the height of the guide such that above a given height, little improvement in reduction of attenuation per length is achieved. However, a reduction in height can effectively increase the attenuation properties of the waveguide. This is made use of in the prior art arrangement of FIG. 1 wherein the section of guide 2 propagates electromagnetic waves of a given frequency with a resonable amount of attenuation, whereas the section 3 would attenuate the waves drastically. In order to eliminate undesirable wave reflections in going from the low attenuation to the high attenuation portions of the guiding systems a matching section is required and this is achieved in FIG. 1a by the use of a taper 4 of the large waveguide to meet the small waveguide section. To match down to a guide which would be sufficiently low in height to provide the desirable amount of attenuation, the matching section would have to be of unduly long length. Coupled with the difficulties of an unduly long matching section, it is obvious that the flow of high power into a thin waveguide section, would result in arcing and other adverse operating effects. In accordance with the present invention, an arrangement as shown in FIG. 2 is capable of providing a desirable amount of attenuation with a minimum of wave reflection and without the need for an unduly long matching section. Applicants achieve these desirable results by dividing the power available in the waveguide into several portions determined by the number of thin parallel spaced apart conductive plates 5 which are positioned within the waveguide perpendicular to the electrical field E established by the waves of the dominant mode being propagated down the guide, the degree of perpendicularity and their thickness determining the amount of reflection from the plates. Each of the narrow waveguide portions 6 operate to incrementally attenuate the portion of the divided amount of wave energy being propagated therethrough. By making the conductive plates 5 sufficiently thin, the need for impedance matching is substantially eliminated. This is due to the fact that since the impedance of a waveguide section depends upon the height of the waveguide, and since the conductive plates are sufficiently thin that they occupy a very small portion of the height, the overall impedance remains essentially the same, while the impedance of the individual narrow gaps is lower than that of the main guide. These individual impedances add up to equal, substantially, the impedance of the main waveguide portion 7. The useful manner in which applicants' arrangement operates can be gleaned from looking at the curves shown associated with FIG. 2 wherein the position along the guide is plotted as abscissa and either attenuation, radio frequency power or overall waveguide impedance is plotted as ordinate. No attempt has been made to dimension the relative values of these characteristics but merely to indicate their changing qualities due to the waveguide construction arrangement. It is seen that the attenuation of the guide continues uniformly until the thin plate construction is reached, at which time it jumps to a relatively high value. The radio frequency power correspondingly is decreased as shown by the exponential curve. It should be noted that these desirable characteristics are achieved without any substantial change in the overall characteristic impedance of the two different waveguide portions.

Figure 3B:
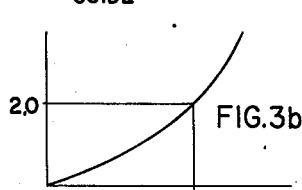
FIGS. 3 and 3a illustrate in cross-sectional form a waveguide configuration in accordance with the invention which is capable of satisfying different waveguide requirements. The associated graph of FIG. 3b shows impedance mismatch, as measured by VSWR, plotted as a function of percentage of waveguide volume filled with metal plates.
Figure 3:
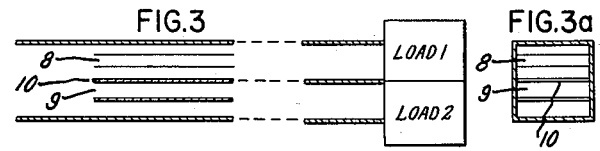
Figure 3A:
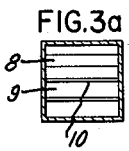

Referring to FIG. 3, there is shown in cross-sectional form an application of the invention to accommodate at least two different load conditions. It should be noted that the narrow waveguide portion 8 consists of three narrow sections established by the use of two thin metallic plates, whereas the oher waveguide portion 9 is divided into two parts by the use of a relatively thick metallic plate. Since the gap height of the thin plate waveguide portion is smaller than that of the thick guide portion, a greater attenuation per length and consequently a greater power loss is achieved in the upper waveguide portion. Accordingly more of the power is propagated into the load circuit #2 than to the circuit #1 even though the initial power split was into two equal waveguide portions established by the center plate 10. It should be noted that the thin plate construction provides the ideal matching conditions. As the volume of the guide is filled with metallic plates, the degree of mismatch increases accordingly. This increase of mismatch with thickness of metal plates can be realized by reference to the curve associated with FIG. 3b where the voltage standing wave ratio is plotted as ordinate and the percentage of waveguide volume filled with metal plates is plotted as abscissa. Methods and means for overcoming this undesirable mismatch while permitting use of thick plate construction will be described subsequently.

Figure 4:
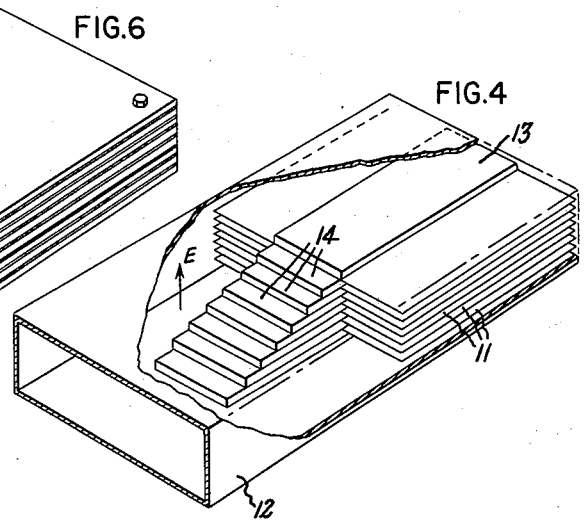
FIG. 4 illustrates a cut-away section of a wave-guide construction employing thin metal plates separated by a dielectric material together with an appropriate matching arrangement.

Referring to FIG. 4, there is shown a method of construction employing thin metallic plates 11 spaced apart in parallel fashion and perpendicular to the electric field established by waves propagated along the waveguide 12. To provide the desired spacing between the thin metallic plates, dielectric spacers 13 are provided. Spacers of the type comprising fibre glass, mica, ceramic, or other high temperature dielectric materials have been employed. It is well known that inserting a dielectric material into a waveguide itself introduces a certain amount of mismatch. To compensate for this, while permitting the desired spacing construction applicant has resorted to the use is made of a matching section which in the preferred embodiment of FIG. 4 constitutes extension of the dielectric slabs 13 in step fashion as illustrated at 14. The dimensioning and configuration of the dielectric matching sections is established to provide the desired minimum of mismatch which can be tolerated.

Figure 5A:
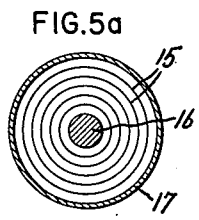
FIGS. 5 and 5a illustrate in cross-sectional form the application of the invention to a coaxial transmission line construction.
Figure 5:
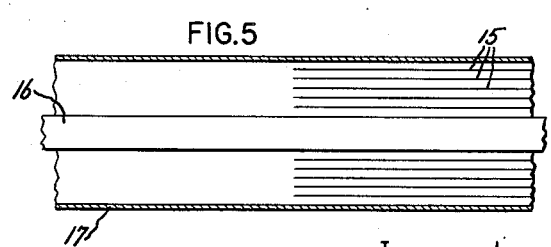

Referring to FIG. 5, there is shown in cross-sectional form the use of thin conductive tubes 15, concentrically arranged around the central or inner conductor 16 of the coaxial transmission line comprising an outer conductor 17 and the inner conductor 16. The space between the conductive tubes can be filled with solid dielectric material, or by the use of spacers, an air gas or fluid dielectric fluid may be employed. In one embodiment a string of dielectric material was spirally wound in the gap between each tube to provide the degree of separation necessary.

Figure 6:
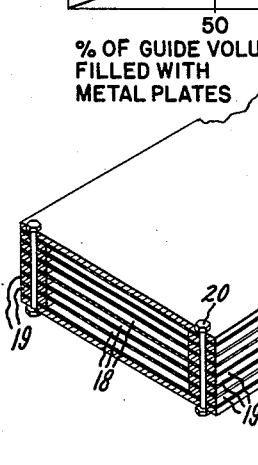
FIG. 6 illustrates a method of constructing waveguide components in accordance with the invention which is capable of employing thick and thin electrically conductive plates type.

Referring to FIG. 6 there is shown a type of waveguide construction employing sheets of conductive material 18 with the gap height of the attenuating narrow waveguide portions established by the use of electrically conductive side spacers 19. These side spacers comprise metallic strips such as copper or aluminum which are sandwiched between the metallic plates near the edges of the wave guide assembly and the entire structure fastened together by suitable means such as the bolt and nuts construction. It should be noted that while the use of relatively thick metallic conductors has been shown it is obvious that the construction also lends itself equally well to thin wall construction.

Figure 7A:
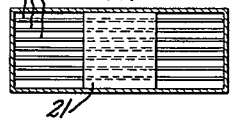
FIGS. 7 and 7a illustrate in cross-sectional form a thick plate waveguide construction provided with a matching section.
Figure 7:
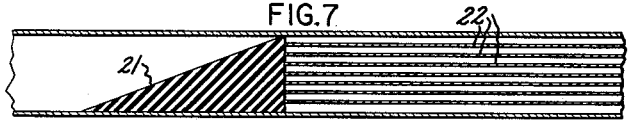

Referring to FIG. 7 there is shown in cross-sectional form an arrangement for reducing the undesirable reflection resulting from the use of thick metallic plates as previously described in connection with the FIG. 2. In this instance, a wedge shape dielectric material 21 is provided to obtain the desired degree of mismatch correction or matching necessary to facilitate optimum operation. Although the space between the thick metallic conductive plates or wall 22 has been shown to comprise air, it is obvious that dielectric spacers may be employed as previously indicated with respect to FIG. 4.

Figure 8A:
FIGS. 8 and 8a illustrate a tapered metal plate waveguide assembly in accordance with the invention.
Figure 8:

Another method and means for overcoming the undesirable mismatch resulting from the use of thick conductive plates is shown in FIG. 8. Here tapering of the plates 23 is employed to provide the desired degree of matching. In one embodiment, the tapering was achieved by taking the individual thick metallic plates and either machining them or etching them away with suitable etching materials to provide the desired degree of taper.

Figure 9A:
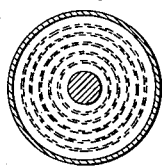
FIGS. 9 and 9a illustrate in cross-sectional form a thick plate coaxial line transmission arrangement using dielectric matching.
Figure 9:
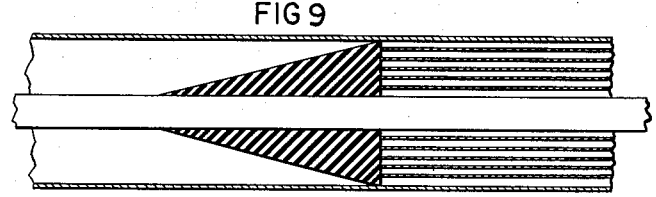

FIG. 9 shows the application of the teachings of FIG. 7 to a coaxial transmission line construction.

Figure 10A:
FIGS. 10 and 10a illustrate in cross-sectional form a ramp step, thick-plate, waveguide construction.
Figure 10:
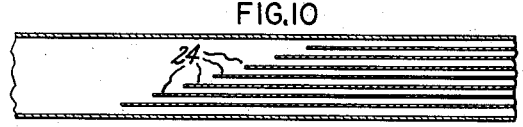

FIG. 10 illustrates in cross-sectional form another arrangement in accordance with the invention for providing the desired degree of matching whenever thick conductor plates are employed. To avoid the need for the dielectric matching sections, shown in FIGS. 4 and 7 the thick metallic conductor plates are ramp stepped at 24 as shown. The angle of the ramp step is dimensioned in accordance with the degree of mismatch correction that is necessary, and in view of the operating frequency requirements consistent with practical construction limitations.

Figure 11:
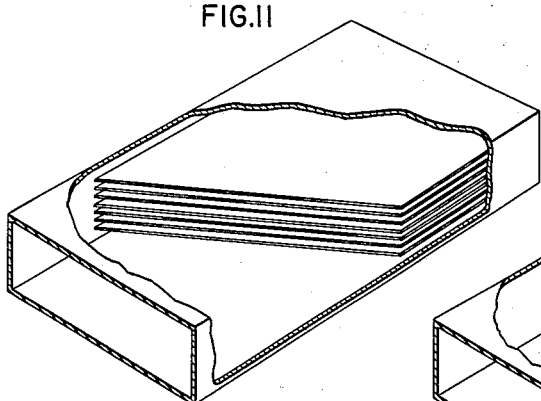
FIGS. 11 and 12 illustrate, in cut-away, cross-section different forms of pointed type thick plate waveguide construction.
Figure 12:
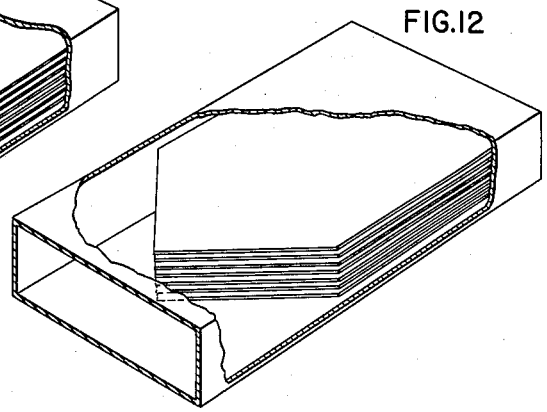
Figure 13:
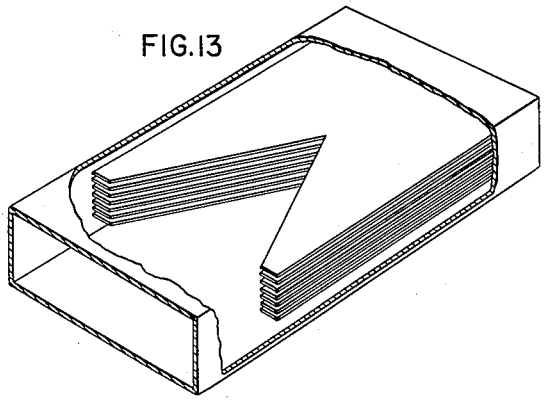
FIG. 13 illustrates in cross-sectional form a waveguide assembly employing V-notched, thick plate construction.

FIGS. 11, 12 and 13 indicate further embodiments of the invention for overcoming mismatch whenever thick metallic plates are employed.

Figure 14:
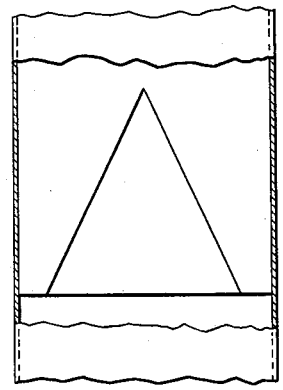
FIGS. 14 and 14a illustrate in cross-sectional form a waveguide assembly employing V-notched, thick metallic plates with a thin metallic insert for broad band operation.

The arrangement of FIG. 13 however, has a low frequency limitation under certain conditions. This is overcome by use of the web construction shown in FIG. 14. It is noted that the notch in each thick conductive plate is closed by the use of a thin conductive web spacer 25. It can be shown that the arrangement of FIG. 14 is less frequency sensitive under certain conditions than the arrangement of FIG. 13.

Figure 15:
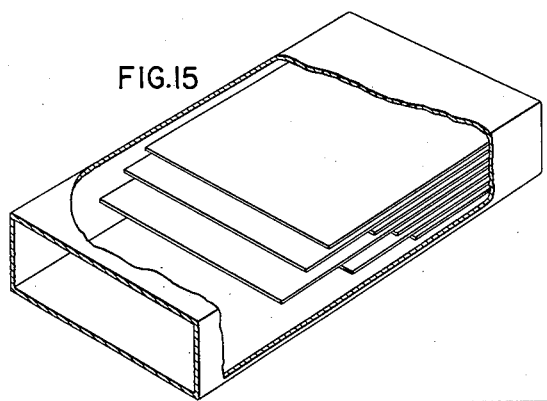
FIG. 15 illustrates in cut-away cross-sectional form a waveguide construction employing staggered steps of thick metallic plates to provide step attenuation to a desired level.
Figure 14A:
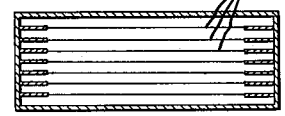

FIG. 15 illustrates in cut-away cross sectional form an arrangement for providing staggered step attenuation up to a desired level. The staggered step construction of FIG. 15 has been found to give a better attenuation characteristic in the step portion of the attenuator than is possible with the ramp step type construction of FIG. 10. The stagger step configuration and dimensioning of the various spacings is selected to be consistent with frequency, and matching requirements.

Figure 16:
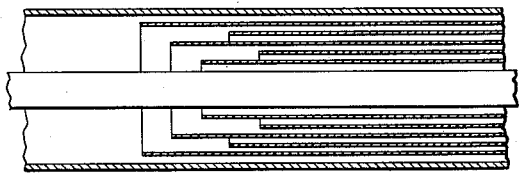
FIGS. 16 and 16a illustrate in cross sectional form a staggered step plate construction; applicable to coaxial transmission lines.
Figure 16A:
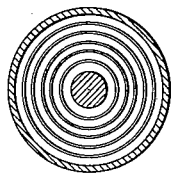

FIG. 16 illustrates the application of the teachings of FIG. 15 to a coaxial transmission line. Although the spacing between the tubular thick conductive plates has been shown to be air it is obvious that dielectric materials may be used.

Figure 17:
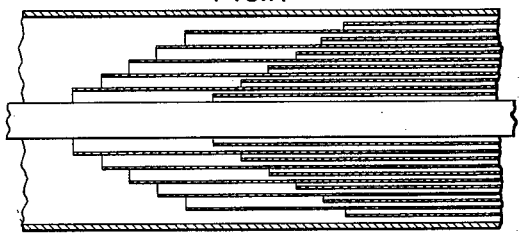
FIGS. 17 and 17a show a concentrically wound, staggered step plate construction applicable to coaxial transmission lines.
Figure 17A:
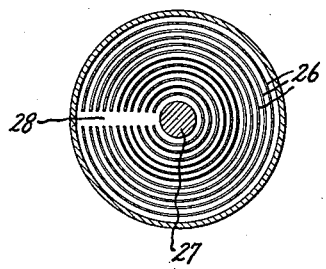

FIG. 17 illustrates an attenuator construction for use with coaxial transmissions lines. In this case an array of concentric metallic conductive tubes 26 is placed around the central or inner conductor 27. The construction here permits the use of conductive sheets being wrapped around the inner conductor concentrically and spaced apart from each other. The gap 28 merely indicates that it is not necessary that the sheets be continuous.

FIG. 18 illustrates a further modification of the invention for use with coaxial transmission lines and here a thick metallic conductor 29 is spirally wrapped around the inner conductor 30 of the coaxial transmission line. The proper degree of spacing between the adjacent layers is obtained by the use of a suitable dielectric material. In one instance a flexible dielectric string spirally wrapped around the metallic conductor sheet provided the necessary spacing. To prevent electrical shorting between adjacent metallic layers, the conductive sheets are cut, for example by a milling machine, as indicated by the slot 31. It is obvious that the arrangement of FIG. 18 lends itself to various modifications suitable for mass production. For example, a conductive material, such as aluminum is vaporized onto a flexible plastic dielectric film which could be then wrapped around the center conductor and slotted.

FIGS. 19, 20 and 21 illustrate the application of the present invention for terminating waveguide loads. In FIGS. 19 and 20, the thick metallic conductor sheets 32 are electrically shorted at their ends by use of electrically conductive shorting bars 33.

The arrangement of the shorting bars of FIG. 20 is preferred to that of FIG. 19 under certain conditions. In the case of the former, the staggering of the shorting bars results in a certain amount of random phase shift between the slight amount of energy which may be reflected from the shorting bar, and these reflected amounts are cancelled to varying degrees.

FIGS. 22 and 23 illustrate variations in the configuration of the shorting bars or plate 33 of FIGS. 19 and 20 to provide a better end termination under certain operating conditions. The views of FIGS. 22 and 23 are top views taken along the direction of arrow 34 in FIGS. 19 and 20.

FIG. 21 illustrates a further end termination for a waveguide construction employing thin conductive plates 35 between thick conductive plates 36 for providing a desired degree of attenuation. The space between the thin and thick conductive plates is a suitable dielectric such as air, or mica, fibre glass, or a ceramic. Due to the relatively high attenuation introduced by the combination of conductive plates 35 and 36 no shorting bars would be required in the arrangement of FIG. 21 under certain conditions.

While the discussion with respect to FIGS. 19 through 21 has been directed to rectangular waveguide construction, it is obvious that the teachings extend to other waveguide configurations and particularly to the coaxial type construction previously disclosed with respect to the other drawings.

FIG. 24 shows a further embodiment of the present invention wherein the end termination is provided by the end of guide devoid of any conductive plates 37 and shorted at 38. Under certain operating conditions, the open circuit construction of FIG. 24 would prove a suitable substitute for the short circuiting arrangements previously discussed.

Turning to FIG. 25 there is shown a plan view, in a direction perpendicular to the largest dimension of a rectangular guide, a thick or thin conductive plate construction suitable for use as an attenuation pad. Oftentimes in systems propagating electromagnetic waves over various waveguide paths, the need arises to reduce the amount of power being fed into a particular waveguide section. It is here that the arrangement of FIG. 25 would prove suitable. The notching 39 in the conductive plates 40 again is utilized to provide the necessary degree of mismatch correction.

FIG. 26 illustrates an attenuating pad construction for a coaxial transmission line. Here the staggered step type of construction is employed to provide a high degree of matching and a desirable attenuation characteristic over the matching section portion.

FIG. 27 illustrates in a partially cut away cross-sectional view, a matching transformer employing the teaching of the present invention. Here it is desired that the impedance of the open section of the guide at point 41 be suitably matched to a load circuit appearing in the section indicated by the reference numeral 42. To achieve the proper degree of impedance transformation, the conductive plates 43 are adapted to provide the degree of impedance transformation desirable. To achieve the desired impedance match, the length and thickness of the conductive plates 43 and the open waveguide spacing 44 between the load circuit 42 and the matching transformer comprising the plate 43 are appropriately dimensioned. By varying the ratio of metal to waveguide gap, different degrees of mismatch may be obtained. By varying the dimension of the plates 43 along the length of the guide, the frequency at which the mismatch occurs may be determined.

FIG. 28 illustrates the application of the present invention to a sandwich line type of wave transmission system. In this sandwich type line, the electromagnetic waves are propagated through the dielectric medium 45 and guided by the strip, conductive plate 46 and the conductive plates 47 and 48. In the application to a sandwich type construction, thin metallic conductive plates 49 are provided as shown. To achieve the desired matching characteristics the ramp type arrangement of conductive plates 49 is employed.

FIG. 29 shows constructional details which are useful in adapting the invention to extremely high power attenuation conditions. Due to the high degree of attenuation capable with the present construction and methods excessive heating may develop in the leading edge of the metallic conductive plates 50. If uncontrolled, this heating may ultimately result in warping of the plates and consequent deterioration of the desirable properties of the inventive arrangement. To convert the high currents resulting from the spaced parallel plate attenuator construction to heat, applicants have resorted to the use of poor heat conductive materials such as stainless steel, low carbon steel, etc. The high resistivity of these materials results in high conversion efficiency of current to heat. To dissipate the heat rapidly, the plates 50 of FIG. 29 may be comprised of copper sheets 51 clad or coated with stainless steel 52 or any suitable resistivity material. The heat thus is quickly carried by the copper portion to the side wall of the guide where it can be readily dissipated. In order to spread the heating to the side walls and along the length of the guide, use can also be made of a highly electrically conductive coating such as a silver plate 53 shown in FIG. 30. The silver plating or high electrically conductive coating reduces heating at the middle of the plates to avoid warping, etc., and permits the portion of the plates adjacent to the side to perform most of the heat dissipation. The configuration of the conductive coating shown in FIG. 30 was found to be useful in at least one application. It is obvious that other configurations are possible within the scope of the present invention.

While a specific embodiment has been shown and described, it will of course be understood that various modifications may yet be devised by those skilled in the art which will embody the principles of the invention and found in the true spirit and scope thereof.

What we claim as new and desire to secure by Letters Patent of the United States is:

1. An arrangement for attenuating waves propagated within a waveguide comprising at least one electrically conductive plate positioned within said guide, said plate having a predetermined length in the direction of propagation of said waves and oriented with respect to the electric field established by said propagated waves sufficient to develop high currents in said waveguide in response to the propagation of said waves, said plate comprising material offering a high resistance to the flow of said currents sufficient to cause waves propagated through the waveguide portions comprising said plate to be attenuated.

2. In combination, a sandwich-type waveguide comprising a strip conductor spaced from an electrically conductive waveguide wall of substantially greater width, a dielectric medium filling the space between said strip conductor and said wall, and at least one electrically conductive plate mounted within said dielectric between said strip conductor and said wall and substantially perpendicular to the electric field established by the waves to be propagated in said waveguide for causing high currents to be developed in said plate in response to propagation of waves past said plate, said plate comprising material offering a high resistance to the flow of said currents sufficient to cause said waves being propagated past said plate to be attenuated.

3. In combination, a waveguide arrangement comprising first, second and third portions serially connected, means located in said second portion for attenuating waves to be propagated through said second portion, said means comprising a plurality of conductive plates, spaced apart within said guide and perpendicular to the electric field established by waves to be propagated in said arrangement sufficient to cause high electric currents to flow in said waveguides in response to propagation of said waves through said second portion, said plates having a thickness and length along the direction of propagation of said waves and formed of material offering a high resistance to the flow of said currents sufficient to effect a desired attenuation of said waves, means for reducing reflection of propagated waves from said conductive plates comprising said conductive plates having a length adapted to provide a staggered step configuration in the direction from which waves are to be propagated through said arrangement.

4. An arrangement for attenuating waves propagated in a waveguide, said waveguide having a height in the direction parallel to the electric field established by waves propagated therethrough sufficient to propagate said waves without attenuation, electrically conductive means for dividing said waveguide into a plurality of waveguides of height smaller than said predetermined height for a predetermined portion of its length sufficient to develop the flow of high currents therein in response to the propagation of said waves and said electrically conductive means comprising material offering a high resistance to the flow of said currents sufficient to substantially attenuate said waves, and waveguide means for recombining said last-named waves having a height in the direction parallel to the electric field established by waves propagated therethrough to propagate said waves without attenuation.

5. In combination, a waveguide arrangement comprising a plurality of electrically conductive plates spaced apart at the operating frequency of said waveguide sufficient to cause high currents to flow in response to waves being propagated in said waveguide, said electrically conductive plates being formed of material offering a high resistance to the flow of said currents sufficient to attenuate said waves being propagated therethrough, means for reducing reflection of propagated waves from said conductive plates comprising said conductive plates each having a length adapted to provide a staggered step configuration in the direction opposite to the direction from which waves are to be propagated in said guide.

References Cited in the file of this patent

UNITED STATES PATENTS

| | | |
|---|---|---|
| 2,129,669 | Bowen | Sept. 13, 1938 |
| 2,206,683 | Wolff | July 2, 1940 |
| 2,460,401 | Southworth | Feb. 1, 1949 |
| 2,508,479 | Wheeler | May 23, 1950 |
| 2,567,210 | Hupcey | Sept. 11, 1951 |
| 2,594,978 | Nelson | Apr. 29, 1952 |
| 2,610,250 | Wheeler | Sept. 9, 1952 |
| 2,663,848 | Lewis | Dec. 22, 1953 |
| 2,709,789 | Worrell | May 31, 1955 |
| 2,722,661 | Walder | Nov. 1, 1955 |
| 2,760,171 | King | Aug. 21, 1956 |
| 2,769,148 | Clogston | Oct. 31, 1956 |
| 2,770,781 | Harvie | Nov. 13, 1956 |
| 2,790,149 | Harvie | Apr. 23, 1957 |